(12) United States Patent
Olgaard et al.

(10) Patent No.: US 8,842,549 B2
(45) Date of Patent: Sep. 23, 2014

(54) SYSTEM AND METHOD FOR PARALLEL TESTING OF MULTIPLE DATA PACKET SIGNAL TRANSCEIVERS

(71) Applicant: Litepoint Corporation, Sunnyvale, CA (US)

(72) Inventors: Christian Volf Olgaard, Saratoga, CA (US); Ruizu Wang, San Ramon, CA (US); Erdem Serkan Erdogan, Sunnyvale, CA (US); Mathew Philip, Palo Alto, CA (US)

(73) Assignee: Litepoint Corporation, Sunnyvale, CA (US)

( * ) Notice: Subject to any disclaimer, the term of this patent is extended or adjusted under 35 U.S.C. 154(b) by 128 days.

(21) Appl. No.: 13/716,369

(22) Filed: Dec. 17, 2012

(65) Prior Publication Data

US 2014/0169182 A1    Jun. 19, 2014

(51) Int. Cl.
*H04W 24/00* (2009.01)
*H04L 12/26* (2006.01)

(52) U.S. Cl.
CPC .............. *H04W 24/00* (2013.01); *H04L 43/50* (2013.01)
USPC ........................................................ 370/241

(58) Field of Classification Search
CPC ....... H04W 24/06; H04L 43/50; H04L 43/00; H04L 12/2697; H04J 3/14
USPC .......................................... 370/241, 242, 245
See application file for complete search history.

(56) References Cited

U.S. PATENT DOCUMENTS

| | | | |
|---|---|---|---|
| 6,252,888 B1 * | 6/2001 | Fite et al. | 370/466 |
| 6,393,023 B1 | 5/2002 | Shimizu et al. | |
| 7,681,101 B2 | 3/2010 | Oran et al. | |
| 7,940,663 B2 | 5/2011 | Kadous | |
| 8,085,685 B2 * | 12/2011 | Olgaard | 370/252 |
| 2003/0032445 A1 | 2/2003 | Suwa | |
| 2007/0177567 A1 | 8/2007 | Parys | |
| 2009/0180464 A1 | 7/2009 | Walley et al. | |
| 2011/0090799 A1 * | 4/2011 | El-Hassan et al. | 370/241 |
| 2012/0195265 A1 | 8/2012 | Kim et al. | |
| 2012/0216091 A1 * | 8/2012 | Blostic et al. | 714/741 |
| 2013/0104010 A1 * | 4/2013 | Rhoads et al. | 714/799 |

FOREIGN PATENT DOCUMENTS

| | | |
|---|---|---|
| EP | 1560383 | 8/2005 |
| EP | 2330864 | 6/2011 |
| WO | 93-23947 | 11/1993 |

OTHER PUBLICATIONS

U.S. Appl. No. 13/716,573, "Method of Facilitating Testing of Multiple Time-Division-Duplex (TDD) Data Packet Signal Transceivers" filed Dec. 17, 2012; Christian Volf Olgaard et al.
International Search Report and Written Opinion Dated Nov. 11, 2013 for PCT Application No. PCT/US2013/069430.
International Search Report and Written Opinion in PCT/US2013/069212 issued on Mar. 11, 2014, 12 pages.

* cited by examiner

*Primary Examiner* — Min Jung
(74) *Attorney, Agent, or Firm* — Vedder Price, P.C.

(57) ABSTRACT

System and method for facilitating testing of multiple data packet signal transceivers involving data-packet-signal replication and one or more status signals indicating successful and unsuccessful receptions of confirmation signals. Based upon the one or more status signals, one or more control signals cause the replicated data packet signals to be distributed to the devices under test (DUTs) such that, following successful and unsuccessful receptions of confirmation signals, corresponding replicated data packet signals are caused to fail to conform in part or to conform, respectively, with a predetermined data packet signal standard.

20 Claims, 5 Drawing Sheets

SYSTEM AND METHOD FOR PARALLEL TESTING OF MULTIPLE DATA PACKET SIGNAL TRANSCEIVERS

BACKGROUND OF THE INVENTION

The present invention relates to testing of data packet signal transceivers, and in particular, to systems and methods for parallel testing of multiple such devices.

Many consumer electronics products, particularly, handheld devices, use various wireless signal technologies, both for connectivity as well as communications purposes. Because such wireless devices transmit and receive electromagnetic waves, and because two or more wireless devices have the potential of interfering with the operations of one another by virtue of their signal frequencies and power spectral densities, these devices and their wireless technologies subscribe to various wireless signal technology standard specifications.

When designing and manufacturing such devices, manufacturers take extraordinary care to ensure that such devices will meet or exceed the prescribed standard-based specifications for each wireless technology used by such devices. Furthermore, once these devices are in mass production, they are tested to ensure that manufacturing defects will not cause improper operation, including their adherence to the included wireless technology standard-based specifications.

As part of such manufacturing test, current wireless device test systems employ a subsystem for analyzing signals received from a device, e.g., a vector signal analyzer (VSA), as well as a subsystem for generating signals to be received by the device, e.g., a vector signal generator (VSG). The analyses performed by a VSA and the signals generated by a VSG are usually programmable, so as to allow each subsystem to be used for testing devices in accordance with a variety of wireless technology standards, including those with differing frequency ranges, bandwidths and modulation characteristics.

Wireless device manufacturers are under constant pressure to keep manufacturing and testing costs down in order to preserve profit margins facing constant reduction pressures due to competition and consumer expectations of new and additional features at no more, or even lower, costs than previous models. Accordingly, systems and techniques for performing manufacturing tests of devices using the various wireless technologies are designed to test using less time and less testing hardware. For example, in addition to reducing handling and set-up times, some test systems are designed to test multiple devices under test (DUTs) concurrently (often referred to as "parallel testing").

As with single-DUT testing, a tester must determine that a device is ready to receive or send test signals. With parallel testing, establishing readiness of a DUT can be far more complicated and time consuming. For example, if a tester sends a set of identical readiness packets to multiple DUTs, it is often the case that one or more of the DUTs may not receive it, i.e., the DUT is not yet ready. Ideally, one would wish to halt sending readiness packets to the DUTs that did acknowledge receipt, while continuing to send readiness packets to those DUTs who have not yet acknowledged receipt, until all DUTs have indicated their readiness. However, halting the sending of packets to some DUTs while continuing to send them to others raises the possibility of packet leakage, i.e., reception of data packets by DUTs not intended to receive such data packets.

Accordingly, it would be desirable to have a test system and method for establishing readiness of multiple DUTs for parallel testing while requiring a minimal time interval for establishing readiness of all DUTs, and not having those DUTs responding as ready more quickly also receiving unintended tests signals.

SUMMARY

In accordance with the presently claimed invention, a system and method are provided for facilitating testing of multiple data packet signal transceivers involving data-packet-signal replication and one or more status signals indicating successful and unsuccessful receptions of confirmation signals. Based upon the one or more status signals, one or more control signals cause the replicated data packet signals to be distributed to the devices under test (DUTs) such that, following successful and unsuccessful receptions of confirmation signals, corresponding replicated data packet signals are caused to fail to conform in part or to conform, respectively, with a predetermined data packet signal standard.

In accordance with one exemplary embodiment of the presently claimed invention, circuitry for facilitating testing of multiple data packet signal transceivers includes: signal routing circuitry responsive to an incoming data packet signal and one or more control signals by providing a plurality of outgoing data packet signals for a plurality of data packet signal transceivers, wherein each one of the plurality of outgoing data packet signals corresponds to the incoming data packet signal and includes one or more sequential data packets with a data packet signal characteristic; confirmation signal detection circuitry responsive to successful and unsuccessful receptions of respective ones of a plurality of confirmation signals from the plurality of data packet signal transceivers by providing one or more status signals indicative of the successful and unsuccessful confirmation signal receptions, wherein each one of the plurality of confirmation signals is indicative of a successful reception of a valid data packet by a respective one of the plurality of data packet signal transceivers; and control circuitry coupled to the signal routing circuitry and the confirmation signal detection circuitry, and responsive to the one or more status signals by providing the one or more control signals, wherein: following a successful reception of one of the plurality of confirmation signals from a respective one of the plurality of data packet signal transceivers, the signal routing circuitry, in accordance with the one or more control signals, provides a corresponding one of the plurality of outgoing data packet signals with the data packet signal characteristic such that the corresponding one of the plurality of outgoing data packet signals fails to conform in part with a predetermined data packet signal standard; and following an unsuccessful reception of one of the plurality of confirmation signals from a respective one of the plurality of data packet signal transceivers, the signal routing circuitry, in accordance with the one or more control signals, provides a corresponding one of the plurality of outgoing data packet signals with the data packet signal characteristic such that the corresponding one of the plurality of outgoing data packet signals conforms with the predetermined data packet signal standard.

In accordance with another exemplary embodiment of the presently claimed invention, a method of facilitating testing of multiple data packet signal transceivers includes: receiving an incoming data packet signal and one or more control signals and in response thereto providing a plurality of outgoing data packet signals for a plurality of data packet signal transceivers, wherein each one of the plurality of outgoing data packet signals corresponds to the incoming data packet signal and includes one or more sequential data packets with a data packet signal characteristic; responding to successful and unsuccessful receptions of respective ones of a plurality of confirmation signals from the plurality of data packet signal transceivers by providing one or more status signals indicative of the successful and unsuccessful confirmation signal receptions, wherein each one of the plurality of confirmation signals is indicative of a successful reception of a valid data packet by a respective one of the plurality of data packet signal transceivers; and responding to the one or more status signals by providing the one or more control signals, wherein: following a successful reception of one of the plurality of confirmation signals from a respective one of the plurality of data packet signal transceivers, in accordance with the one or more control signals, providing a corresponding one of the plurality of outgoing data packet signals with the data packet signal characteristic such that the corresponding one of the plurality of outgoing data packet signals fails to conform in part with a predetermined data packet signal standard; and following an unsuccessful reception of one of the plurality of confirmation signals from a respective one of the plurality of data packet signal transceivers, in accordance with the one or more control signals, providing a corresponding one of the plurality of outgoing data packet signals with the data packet signal characteristic such that the corresponding one of the plurality of outgoing data packet signals conforms with the predetermined data packet signal standard.

DETAILED DESCRIPTION

The following detailed description of the invention makes use of exemplary embodiments which should not be read as limiting the scope of the claimed invention. Furthermore, the term "signal" or "signals" refers to electromagnetic or optical signals which may be conveyed using conductive or wireless signal paths. Structures depicted in the description and drawings, as is well known in the art, may be implemented using a variety of components and techniques, and the individual functions of such structures are well known in the art. The descriptive term for such structures should not be construed as limiting its implementation to any particular circuit(s) or component type(s).

Further, throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

As discussed in more detail below, test systems and methods in accordance with exemplary embodiments of the presently claimed invention advantageously coordinate testing of multiple DUTs using selective data packet corruption. For example, rather than attempting to interrupt delivery of data packets to one or more DUTs while waiting for other DUTs to acknowledge readiness, selective data packet corruption is used where a DUT has indicated readiness while continuing to send non-corrupted data packets to those that have not yet acknowledged readiness.

An advantage to using selective data packet corruption is that the DUTs that have indicated readiness to proceed with testing will continue to receive subsequent data packets, but will not respond to them, instead rejecting them as being corrupted. Accordingly, rather than sitting idle, waiting for the other DUTs to indicate readiness, and being exposed to the possibility of receiving a "leaked" data packet, these DUTs that have indicated readiness will be immune to leaked data packets while rejecting corrupted ones that are sent to and received by them.

One way of purposely corrupting a data packet is to simply lower its power level at some point during the data packet sequence, thereby ensuring that it will not be received intact by the corresponding DUT. This can be done using virtually any mechanism for signal level control, e.g., signal attenuators or switches, that can be applied to a signal before it arrives at its intended DUT. Further, where a test system has multiple VSGs with each VSG being used for testing a designated DUT, each VSG can be programmed to corrupt the data packet is sending. However, such a multiple VSG configuration will come at a higher system cost than one having a single VSG, as discussed below.

Typically, when receiving a data packet signal, a DUT establishes its signal reception gain at the beginning of the data packet or data packet sequence. Accordingly, reducing the signal power within a single data packet (or within a data packet sequence) results in an abrupt power reduction that causes the DUT to lose the data and reject the data packet or data packet sequence. If the power of the entire data packet or data packet sequence were reduced, the DUT may, erroneously, receive a non-corrupted packet from an adjacent channel being used by and intended for routing a data packet to an adjacent DUT. Therefore, by having good signal power at the beginning of the data packet, the DUT will lock on to the higher signal power of the intended data packet signal and then, when its signal power is subsequently reduced, such data packet will be rejected and not decoded for purposes of testing.

As a result, a system testing multiple, e.g., four, DUTs might begin an initialization synchronization process (SYNC) by sending a set of four identical data packets to four DUTs while taking note of which DUTs return a confirmation signal, e.g., an acknowledgement signal (ACK) for DUTs communicating in accordance with an IEEE 802.11x standard, or a null signal for DUTs communicating in accordance with a time-division-duplex (TDD) signal standard such as Bluetooth. When the test system next sends another set of four data packets, those data packets intended for DUTs that have confirmed reception of the previous data packet are purposely corrupted during their transmission, whereas those data packets intended for DUTs not yet having confirmed reception of the previous data packets will be sent without being corrupted. Generally, this would be done only during the SYNC process. For example, if a particular test called for 100 data packets to be used, such data packets would be sent or received only after the SYNC process has occurred using the selective data packet corruption technique.

This SYNC process will repeat until all DUTs have confirmed data packet reception, following which, one or more uncorrupted data packets are sent by the test system to the DUTs with the expectation that all DUTs will now respond to confirm readiness for testing, thereby confirming that all DUTs are now ready to proceed with the desired receive (RX) and/or transmit (TX) tests.

In those cases where one or more of the DUTs has a manufacturing defect that prevents it from confirming its readiness, the SYNC process can be made to continue for some number of additional data packets, and in the absence of confirmation from one or more DUTs, the test system would consider those DUTs as having failed. This number of additional data packets to be sent would be part of a timeout safeguard procedure.

Such selective data packet corruption advantageously facilitates synchronization of multiple DUTs during parallel testing. For example, in the case of many test sequences, the DUTs will typically need to send or receive (e.g., as part of TX or RX test sequences) a specified number of data packets. Accordingly, sending or receiving test data packets before all DUTs have confirmed reception of a SYNC data packet makes parallel test execution difficult, since each DUT will need a different number of test data packets following final synchronization of all DUTs. Further, it is often desirable to have the different DUTs execute the same test at the same time as to prevent uncontrolled signal coupling between DUTs. By corrupting data packets to specific DUTs until all DUTs have confirmed reception of a SYNC data packet, one can keep the remaining part of the test sequence fully synchronized among the different DUTs, thus having a controlled test execution with known behavior.

In the following discussion, exemplary embodiments are presented in which the confirmation signal is in the form of an acknowledgement (ACK) signal such as that used by data packet transceivers communicating in accordance with an IEEE 802.11x standard. However, as will be readily apparent to one of ordinary skill in the art, the principles and techniques for using data packet corruption in accordance with the presently claimed invention can also be practiced using data packet transceivers communicating in accordance with other types of signals, including, without limitation, a TDD signal standard such as Bluetooth for which a confirmation signal is in the form of a null data packet. Accordingly, an ACK signal is to be considered merely one example of a confirmation signal suitable for use in practicing the presently claimed invention.

Figure 1:
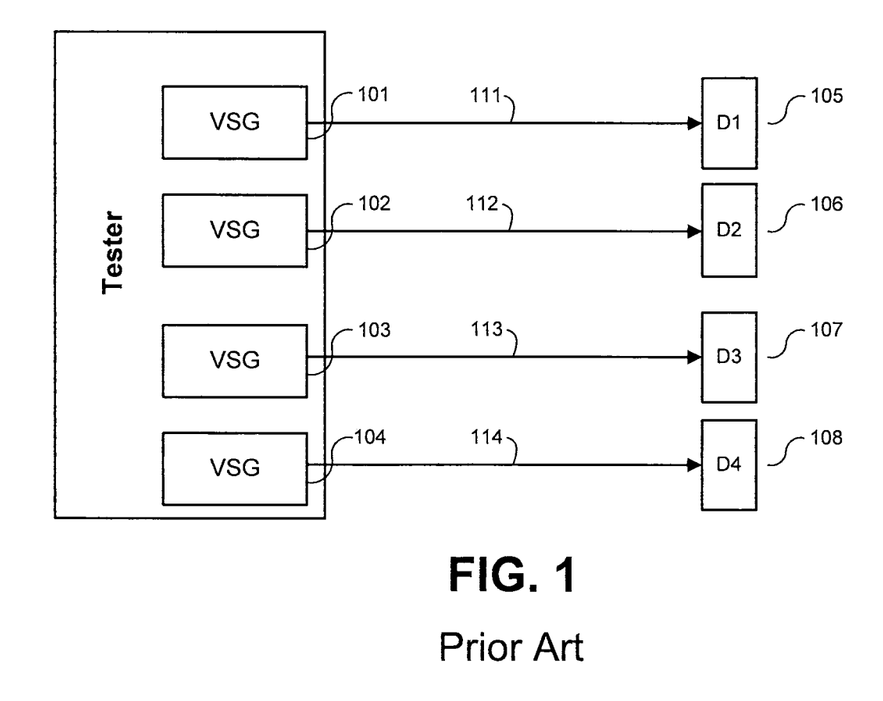
FIG. 1 depicts a conventional test environment for testing multiple DUTs in parallel.

Referring to FIG. 1, a conventional testing environment includes a test system, or "tester", and, in the case of parallel testing, multiple DUTs 105, 106, 107, 108. Typically, the tester includes multiple VSG subsystems 101, 102, 103, 104, each of which provides a respective set of test signals 111, 112, 113, 114 (typically over wired, or cabled, electrical connections, even for wireless DUTs, so as to maintain adequate control over test conditions for each DUT 105, 106, 107, 108). Having a VSG dedicated to each DUT ensures synchronized testing of each DUT, but does not realize the lower subsystem costs of the presently claimed invention.

Figure 2:
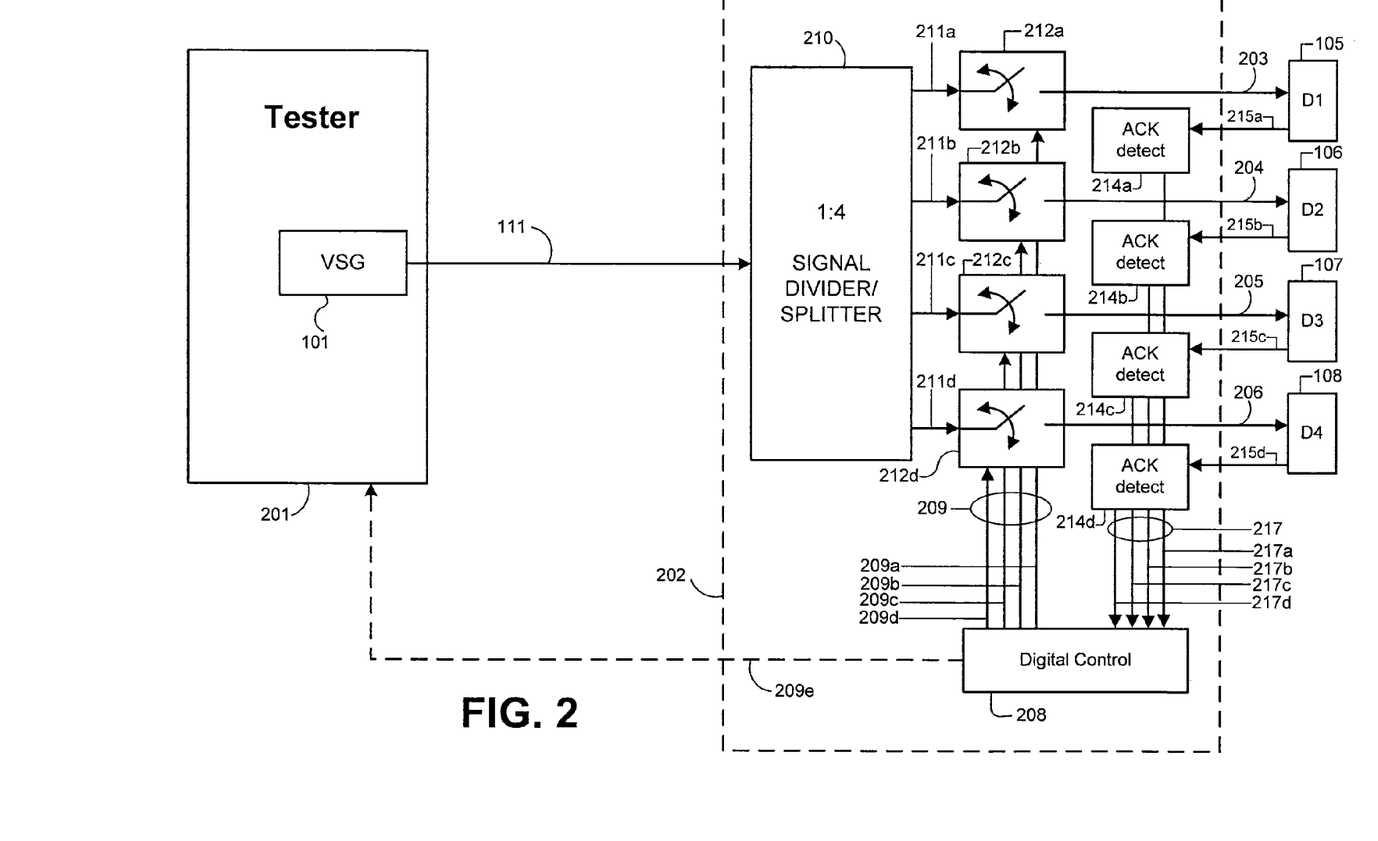
FIG. 2 depicts a testing environment for testing multiple DUTs in parallel in accordance with an exemplary embodiment of the presently claimed invention.

Referring to FIG. 2, a testing environment in accordance with an exemplary embodiment of the presently claimed invention includes a test signal control subsystem 202 for which a tester 201 having only a single VSG subsystem 101 is required for providing a common, or shared, set of test signals 111. The test signal control subsystem 202 includes a signal divider (e.g., signal power divider or splitter) 210, signal level control circuits 212a, 212b, 212c, 212d, acknowledgement signal (ACK) detection circuits 214a, 214b, 214c, 214d, and a controller 208, all interconnected substantially as shown.

The test signal control subsystem 202 performs signal routing by first splitting the incoming data packet signal 111 to provide multiple replica data packet signals 211a, 211b, 211c, 211d, each of which is a replica of the incoming data packet signal 111 and is switched or attenuated by a respective one of the switching or attenuation circuits 212a, 212b, 212c, 212d, in accordance with one or more control signals 209 from the controller 208. The resulting switched or attenuated data packet signals 203, 204, 205, 206 are conveyed to the DUTs 105, 106, 107, 108. Following successful reception of these test signals 203, 204, 205, 206, each DUT 105, 106, 107, 108 transmits, in return, an acknowledgement signal (ACK) 215a, 215b, 215c, 215d. (As will be readily appreciated by one of ordinary skill in the art, and as discussed in more detail below, the respective signal paths for the test signals 203, 204, 205, 206 and ACK signals 215a, 215b, 215c, 215d are shared, e.g., a single wired signal path is used to convey a test signal 203/204/205/206 to a DUT 105/106/107/108 and also convey the ACK signal 215a/b/c/d from such DUT 105/106/107/108.) The ACK signal detection circuits 214a, 214b, 214c, 214d, following successful reception of an ACK signal 215a, 215b, 215c, 215d, provides a corresponding status signal 217a, 217b, 217c, 217d to the controller 208. Hence, each status signal 217a, 217b, 217c, 217d is indicative of the successful or unsuccessful reception of a corresponding ACK signal 215a, 215b, 215c, 215d.

As discussed above, following successful reception of an ACK signal 215, as indicated by the corresponding status signal 217, the controller 208 provides the control signals 209 with appropriate control states such that the corresponding DUT test signal is appropriately corrupted. On the other hand, following unsuccessful reception of an ACK signal 215 from a DUT, as indicated by the status signals 217, the controller 208 provides the control signals 209 with appropriate control signal states such that uncorrupted data packets continue to be transmitted until all acknowledgement signals have been received.

The controller 208 can also provide one or more additional control or status signals 209e to the tester 201, e.g., for initiating or controlling subsequent operations of the VSG 101 for testing the DUTs 105, 106, 107, 108 after they have indicated their readiness to proceed.

Figure 3:
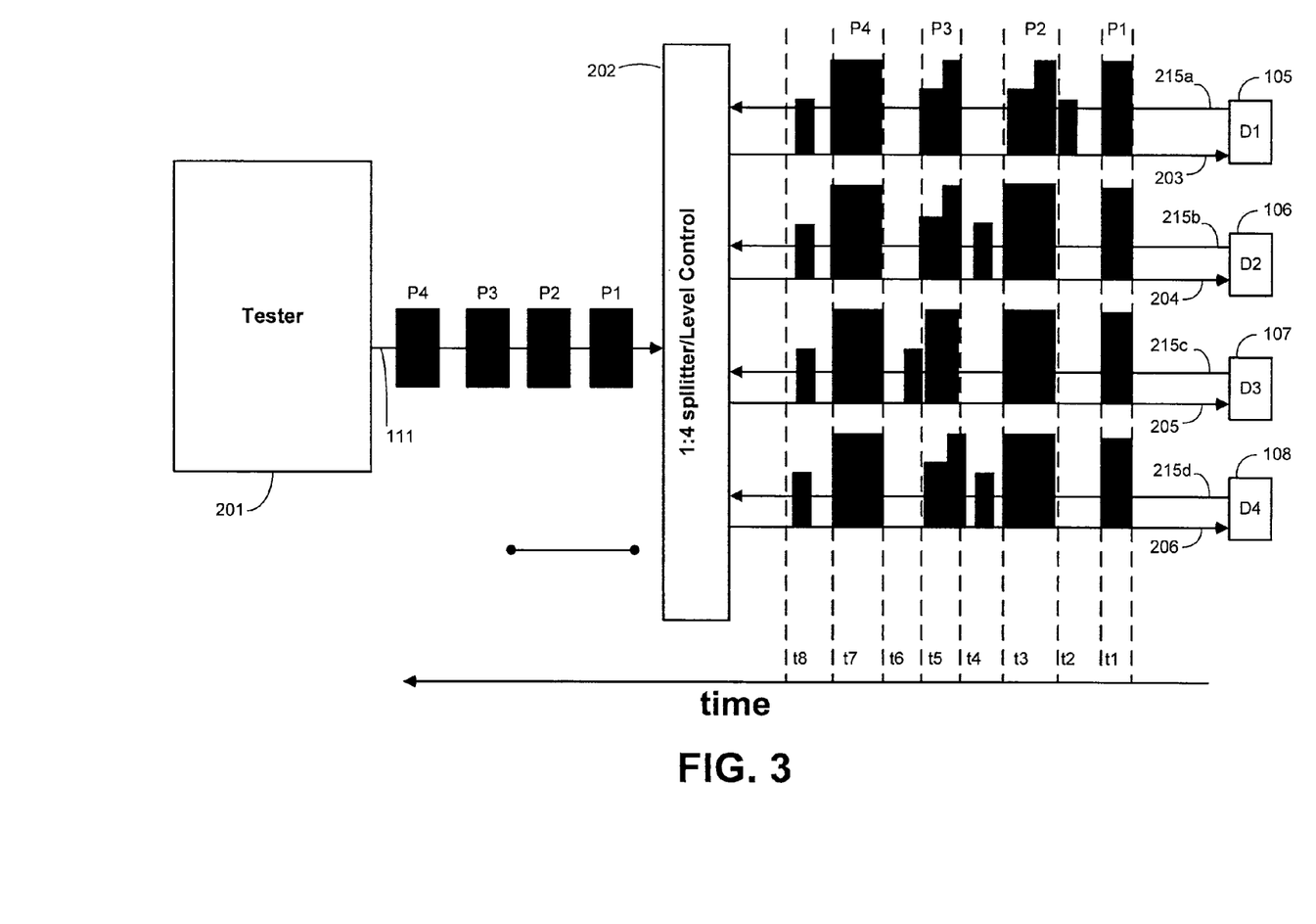
FIG. 3 depicts operation of the testing environment of FIG. 2 in accordance with an exemplary embodiment of the presently claimed invention.

Referring to FIG. 3, this process of selectively sending corrupted test data packet signals can be better understood. As discussed above, the tester 201 provides a sequence of test data packet signals 111, e.g., data packets P1, P2, P3 and P4. As also discussed above, the test signal control subsystem 202 replicates these data packets P1, P2, P3, P4, e.g., during corresponding time intervals T1, T3, T5 and T7 for purposes of this example. During the first time interval T1, the first data packet P1 is transmitted in uncorrupted from, e.g., at full test signal power. These uncorrupted signals 203, 204, 205, 206 are conveyed to their respective DUTs 105, 106, 107, 108.

During time interval T2, the first DUT 105 responds with its ACK signal 215a, while the remaining DUTs 106, 107, 108 do not. Accordingly, during the next test signal transmission interval T3, a second data packet P2 replica 203 is sent in corrupted form to the first DUT 105 while the remaining second data packet P2 replicas 204, 205, 206 are sent in uncorrupted form to the remaining DUTs 106, 107, 108.

As depicted in FIG. 3, the beginning of the second data packet P2 replica 203 to be sent in corrupted form retains a signal power level comparable to the other second data packet replicas 204, 205, 206 to be sent in uncorrupted form. Later, sometime during the transmission interval of the second data packet replicas 203, 204, 205, 206, the power level of the second data packet P2 replica 203 to be sent in corrupted form is changed, e.g., reduced. This delay in the power level change ensures that the automatic gain control (AGC) of the corresponding DUT 105 will have first settled based upon the initial higher signal power level. As a result, the DUT 105 will not be capable of accurately receiving the portion of the signal 203 now having a changed (e.g., lower) power level. Accordingly, the signal 203 will be deemed corrupted.

During the next time interval T4, the second and fourth DUTs 106, 108 respond with their respective ACK signals 215b, 215d. Accordingly, during the next time interval T5, a third data packet P3 replica 205 is transmitted in uncorrupted form to the third DUT 107, while the remaining third data packet P3 replicas 203, 204, 206 are transmitted in corrupted form to the first, second and fourth DUTs 105, 106, 108, since they have previously acknowledged readiness by responding with their ACK signals 215a, 215b, 215d during time intervals T2 and T4. Finally, during time interval T6, the third, and last, DUT 107 responds with its ACK signal 215c. Hence, all DUTs 105, 106, 107, 108 have now responded with their respective ACK signals 215a, 215b, 215c, 215d, thereby indicating readiness for initiation of the test sequence. Accordingly, during the next time interval T7, the tester 201 transmits one or more test initiation data packets P4, to which all DUTs 105, 106, 107, 108, having previously indicated readiness for testing, respond with their respective reply signals 215a, 215b, 215c, 215d during time interval T8 confirming readiness for testing.

For example, this last readiness step can ensure that all DUTs 105, 106, 107, 108 are ready for a packet error rate (PER) test, where the tester 201 will send a predefined number of data packets 111 and analyze the number of acknowledgement signals 215 received in return from each DUT 105, 106, 107, 108 to determine the respective PER for each DUT 105, 106, 107, 108. As is well known in the art, a PER test is a common wireless transceiver RX specification and test, and can serve as a readiness step for other tests to be done fully in parallel, such as a TX test where all DUTs 105, 106, 107, 108 have signified their respective readiness and the DUTs 105, 106, 107, 108 begin transmitting predefined sequences of TX tests data packets.

Figure 4:
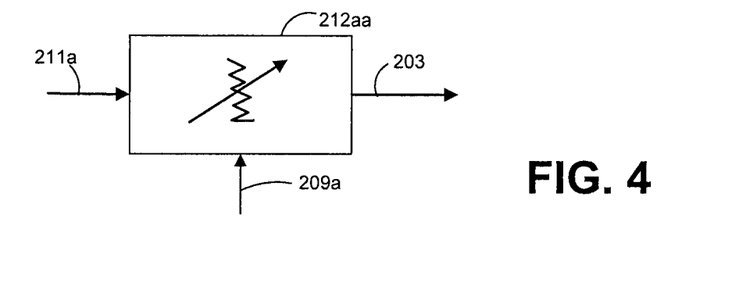
FIG. 4 depicts an alternative embodiment of the signal level control circuitry of FIG. 2.

Referring to FIG. 4, as discussed above, an alternative embodiment 212aa of the switching or attenuation circuitry 212 can include a variable attenuator that, in contrast to switching the DUT test signal 203 on and off, can, instead, impart sufficient attenuation to the signal so as to sufficiently corrupt the signal in accordance with the discussion above.

Figure 5:
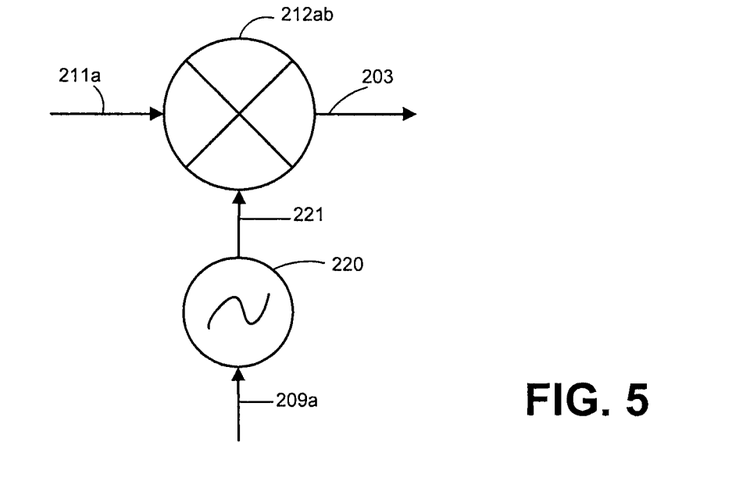
FIG. 5 depicts an alternative embodiment of the signal level control circuitry of FIG. 2.

Referring to FIG. 5, in accordance with another alternative embodiment, instead of switching or attenuation circuitry, signal mixing circuitry 212ab can be used. In this embodiment, corruption of the DUT signal 203 can be achieved by altering the frequency of the replica test signal 211a by mixing it with another radio frequency (RF) signal 221 from a local RF source 220 controlled by the control signal 209a from the controller 208 (FIG. 2).

Based upon this discussion, it should be readily appreciated by those skilled in this art that signal corruption can be achieved in other forms as well. For example, other forms of signal corruption can include a signal level increase and invalid signal modulation. In the case of a signal level increase, the signal switching or attenuation circuitry 212 (FIG. 2) can be replaced with signal amplification circuitry that increases the magnitude of the signal intended to be corrupted above a level at which the target DUT can properly receive it. In the case of invalid signal modulation, the signal modulation technique can be altered to one that is not included in the particular signal standard being tested. Similarly, other data packet bit rates can be used.

Hence, it can be seen that signal corruption can be achieved by altering virtually any data packet signal characteristic including signal power, signal frequency and signal modulation.

Figure 6:
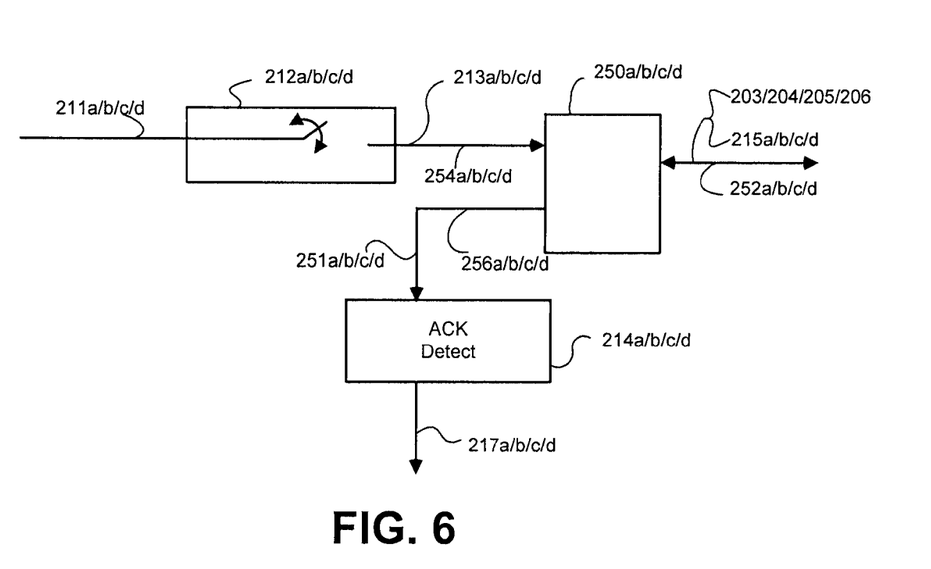
FIG. 6 depicts circuitry for conveying test signals to and confirmation signals from the DUTs in accordance with an exemplary embodiment of the presently claimed invention.

Referring to FIG. 6 (and with reference to FIG. 2), in accordance with exemplary embodiments of the presently claimed invention, the wired signal paths for testing the DUTs 105, 106, 107, 108 are typically in the form of a single wired connection for each DUT 105, 106, 107, 108. For example, for the first DUT 105, the test signal 203 and ACK signal 215a are conveyed via a shared, or common, wired signal path 252a. (Similarly, the test signals 204, 205, 206 to and ACT signals 215b, 215c, 215d from the remaining DUTs 106, 107, 108 are conveyed via respective shared wired signal paths 252b, 252c, 252d.) Each of the signals 213a, 213b, 213c, 213d from the switching or attenuation circuits 212a, 212b, 212c, 212d is conveyed via a respective wired signal path 254a, 254b, 254c, 254d to additional signal routing circuitry 250a, 250b, 250c, 250d (discussed in more detail below) to be conveyed over the wired DUT signal paths 252a, 252b, 252c, 252d as the respective test signals 203, 204, 205, 206. The responsive ACK signals 215a, 215b, 215c, 215d are conveyed in return via the wired DUT signal paths 252a, 252b, 252c, 252d to the routing circuitry 250a, 250b, 250c, 250d for conveyance via a respective output signal path 256a, 256b, 256c, 256d to the ACK signal detection circuits 214a, 214b, 214c, 214d.

This additional signal routing circuitry 250a, 250b, 250c, 250d can be implemented in a variety of forms, in accordance with techniques well known in the art. For example, such routing circuitry 250a/b/c/d can be implemented as a 1:2 signal divider, or splitter, in which case the responsive ACK signals 215a/b/c/d is divided and provided via the corresponding output signal path 256a/b/c/d, albeit as a lower powered version 251a/b/c/d of the original ACK signal. Alternatively, such routing circuitry 250a/b/c/d can be implemented as a signal coupler providing a coupled version of the responsive ACK 215a/b/c/d at the corresponding output signal port 256a/b/c/d. Further alternatively, such routing circuitry 250a/b/c/d can be implemented as a signal switch controlled in accordance with a control signal (not shown) such that during transmission of the test signal 111 by the VSG 101 corresponding signal paths 254a/b/c/d and 252a/b/c/d are connected, while during the time intervals in which the DUTs 105, 106, 107, 108 are expected to respond corresponding signal paths 252a/b/c/d and 256a/b/c/d are connected.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including circuitry for facilitating testing of multiple data packet signal transceivers, comprising:
   signal routing circuitry responsive to an incoming data packet signal and one or more control signals by providing a plurality of outgoing data packet signals for a plurality of data packet signal transceivers, wherein each one of said plurality of outgoing data packet signals corresponds to said incoming data packet signal and includes one or more sequential data packets with a data packet signal characteristic;
   confirmation signal detection circuitry responsive to successful and unsuccessful receptions of respective ones of a plurality of confirmation signals from said plurality of data packet signal transceivers by providing one or more status signals indicative of said successful and unsuccessful confirmation signal receptions, wherein each one of said plurality of confirmation signals is indicative of a successful reception of a valid data packet by a corresponding one of said plurality of data packet signal transceivers; and
   control circuitry coupled to said signal routing circuitry and said confirmation signal detection circuitry, and responsive to said one or more status signals by providing said one or more control signals, wherein
      following a successful reception of one of said plurality of confirmation signals from a respective one of said plurality of data packet signal transceivers, said signal routing circuitry, in accordance with said one or more control signals, provides a corresponding one of said plurality of outgoing data packet signals with said data packet signal characteristic such that said corresponding one of said plurality of outgoing data packet signals fails to conform in part with a predetermined data packet signal standard, and
      following an unsuccessful reception of one of said plurality of confirmation signals from a respective one of said plurality of data packet signal transceivers, said signal routing circuitry, in accordance with said one or more control signals, provides a corresponding one of said plurality of outgoing data packet signals with said data packet signal characteristic such that said corresponding one of said plurality of outgoing data packet signals conforms with said predetermined data packet signal standard.

2. The apparatus of claim 1, wherein following a successful reception of one of said plurality of confirmation signals from a respective one of said plurality of data packet signal transceivers, said signal routing circuitry, in accordance with said one or more control signals, provides a corresponding one of said plurality of outgoing data packet signals with said data packet signal characteristic such that:
   a first portion of said corresponding one of said plurality of outgoing data packet signals conforms with said predetermined data packet signal standard; and
   a second portion of said corresponding one of said plurality of outgoing data packet signals fails to conform with said predetermined data packet signal standard.

3. The apparatus of claim 2, wherein said second portion is subsequent to said first portion.

4. The apparatus of claim 1, wherein said data packet signal characteristic comprises at least one of signal power and signal frequency.

5. The apparatus of claim 1, wherein said signal routing circuitry comprises signal replication circuitry responsive to said incoming data packet signal by providing a plurality of replica data packet signals.

6. The apparatus of claim 5, wherein said signal replication circuitry comprises signal power dividing circuitry.

7. The apparatus of claim 5, wherein said signal routing circuitry further comprises signal attenuation circuitry coupled to said signal replication circuitry and responsive to said plurality of replica data packet signals and said one or more control signals by attenuating at least a portion of one or more of said plurality of replica data packet signals.

8. The apparatus of claim 5, wherein said signal routing circuitry further comprises signal switching circuitry coupled to said signal replication circuitry and responsive to said plurality of replica data packet signals and said one or more control signals by switching at least a portion of one or more of said plurality of replica data packet signals.

9. The apparatus of claim 5, wherein said signal routing circuitry further comprises signal power control circuitry coupled to said signal replication circuitry and responsive to said plurality of replica data packet signals and said one or more control signals by changing a power level of at least a portion of one or more of said plurality of replica data packet signals.

10. The apparatus of claim 5, wherein said signal routing circuitry further comprises signal mixing circuitry coupled to said signal replication circuitry and responsive to said plurality of replica data packet signals, said one or more control signals and one or more radio frequency (RF) signals by converting a frequency of at least a portion of one or more of said plurality of replica data packet signals.

11. A method of facilitating testing of multiple data packet signal transceivers, comprising:
   receiving an incoming data packet signal and one or more control signals and in response thereto providing a plurality of outgoing data packet signals for a plurality of data packet signal transceivers, wherein each one of said plurality of outgoing data packet signals corresponds to said incoming data packet signal and includes one or more sequential data packets with a data packet signal characteristic;
   responding to successful and unsuccessful receptions of respective ones of a plurality of confirmation signals from said plurality of data packet signal transceivers by providing one or more status signals indicative of said successful and unsuccessful confirmation signal receptions, wherein each one of said plurality of confirmation signals is indicative of a successful reception of a valid data packet by a corresponding one of said plurality of data packet signal transceivers; and
   responding to said one or more status signals by providing said one or more control signals, and
      following a successful reception of one of said plurality of confirmation signals from a corresponding one of said plurality of data packet signal transceivers, in accordance with said one or more control signals, providing a corresponding one of said plurality of outgoing data packet signals with said data packet signal characteristic such that said corresponding one of said plurality of outgoing data packet signals fails to conform in part with a predetermined data packet signal standard, and following an unsuccessful reception of one of said plurality of confirmation signals from a corresponding one of said plurality of data packet signal transceivers, in accordance with said one or more control signals, providing a corresponding one of said plurality of outgoing data packet signals with said data packet signal characteristic such that said corresponding one of said plurality of outgoing data packet signals conforms with said predetermined data packet signal standard.

12. The method of claim 11, wherein following a successful reception of one of said plurality of confirmation signals from a respective one of said plurality of data packet signal transceivers, in accordance with said one or more control signals, providing a corresponding one of said plurality of outgoing data packet signals with said data packet signal characteristic such that:
   a first portion of said corresponding one of said plurality of outgoing data packet signals conforms with said predetermined data packet signal standard; and
   a second portion of said corresponding one of said plurality of outgoing data packet signals fails to conform with said predetermined data packet signal standard.

13. The method of claim 12, wherein said second portion is subsequent to said first portion.

14. The method of claim 11, wherein said data packet signal characteristic comprises at least one of signal power and signal frequency.

15. The method of claim 11, wherein said receiving an incoming data packet signal and one or more control signals and in response thereto providing a plurality of outgoing data packet signals comprises replicating said incoming data packet signal to provide a plurality of replica data packet signals.

16. The method of claim 15, wherein said replicating said incoming data packet signal comprises dividing a signal power of said incoming data packet signal to provide said plurality of replica data packet signals.

17. The method of claim 15, wherein said receiving an incoming data packet signal and one or more control signals and in response thereto providing a plurality of outgoing data packet signals further comprises attenuating at least a portion of one or more of said plurality of replica data packet signals.

18. The method of claim 15, wherein said receiving an incoming data packet signal and one or more control signals and in response thereto providing a plurality of outgoing data packet signals further comprises switching at least a portion of one or more of said plurality of replica data packet signals.

19. The method of claim 15, wherein said receiving an incoming data packet signal and one or more control signals and in response thereto providing a plurality of outgoing data packet signals further comprises changing a power level of at least a portion of one or more of said plurality of replica data packet signals 20. The method of claim 15, wherein said receiving an incoming data packet signal and one or more control signals and in response thereto providing a plurality of outgoing data packet signals further comprises mixing one or more of said plurality of replica data packet signals with one or more radio frequency (RF) signals to convert a frequency of at least a portion of said one or more of said plurality of replica data packet signals.

* * * * *